United States Patent [19]

Anetsberger

[11] Patent Number: 4,972,766
[45] Date of Patent: Nov. 27, 1990

[54] CHAR BROILING GRILL

[75] Inventor: Richard J. Anetsberger, Northbrook, Ill.

[73] Assignee: Anetsberger Brothers, Inc., Northbrook, Ill.

[21] Appl. No.: 475,115

[22] Filed: Feb. 5, 1990

[51] Int. Cl.⁵ .................. A47J 27/62; A47J 37/06
[52] U.S. Cl. ...................................... 99/332; 99/349; 99/375; 99/378; 99/379; 99/388; 99/430; 219/524
[58] Field of Search .............. 99/331, 332, 325, 349, 99/372, 375, 376–379, 388–390, 395, 400, 401, 444, 445, 430; 219/524; 100/93 P

[56] References Cited

U.S. PATENT DOCUMENTS

| | | | |
|---|---|---|---|
| 2,039,218 | 4/1936 | Govoroff | 99/379 |
| 2,719,903 | 10/1955 | Oertli | 99/372 |
| 3,010,383 | 11/1961 | Greene | 99/349 |
| 3,312,161 | 4/1967 | Nanna | 99/377 |
| 3,313,230 | 4/1967 | Simjian | 99/349 |
| 3,988,981 | 11/1976 | McDonald | 100/93 P |
| 4,088,067 | 5/1978 | Kabitzsch et al. | 99/379 |
| 4,102,256 | 7/1978 | John et al. | 99/372 |
| 4,150,609 | 4/1979 | McClean | 99/372 |
| 4,165,682 | 8/1979 | Weiss | 99/331 |
| 4,172,750 | 10/1979 | Giulie | 219/524 |
| 4,262,189 | 4/1981 | Eisenhoffer | 219/524 |
| 4,364,308 | 12/1982 | John et al. | 99/351 |
| 4,483,239 | 11/1984 | Mueller et al. | 99/379 |
| 4,586,428 | 5/1986 | Adamson | 99/332 |
| 4,697,504 | 10/1987 | Keating | 99/331 |
| 4,700,619 | 10/1987 | Scanlon | 99/374 |
| 4,744,292 | 5/1988 | Nagata | 99/351 |
| 4,763,571 | 8/1988 | Bergling et al. | 99/349 |

FOREIGN PATENT DOCUMENTS 511964  6/1952  Belgium .................. 99/379

Primary Examiner—Timothy F. Simone
Attorney, Agent, or Firm—McCaleb, Lucas & Brugman

[57] ABSTRACT

A cooking grill having dual heating platens for cooking meats, poultry, fish and like products; the grill having a stationary lower grill platen superposed by a top grill platen selectively moveable to and between four operating positions about one or two pivotal axes; the grill platens being formed with longitudinal lands and grooves to facilitate speed of cooking and moisture release from the cooking products; the lands serving to char spaced areas of the cooked product to emulate charcoal broiling thereof.

7 Claims, 9 Drawing Sheets

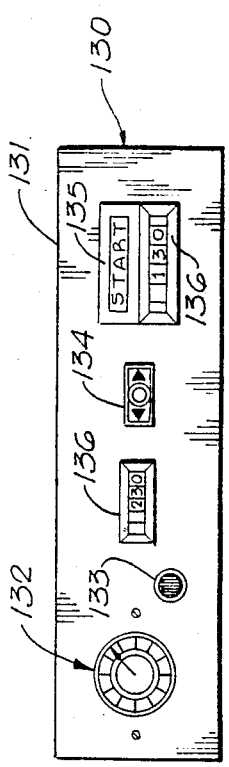
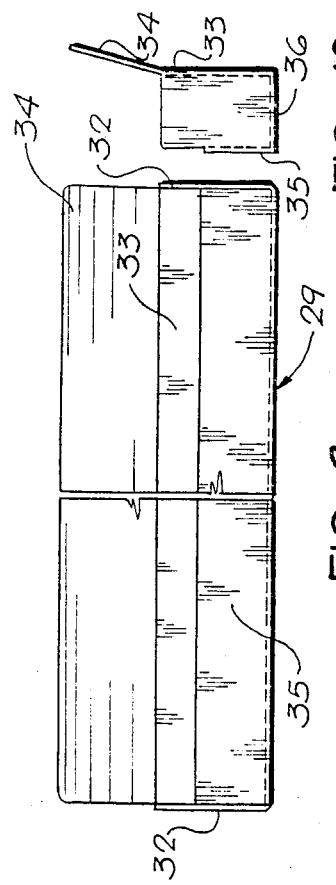
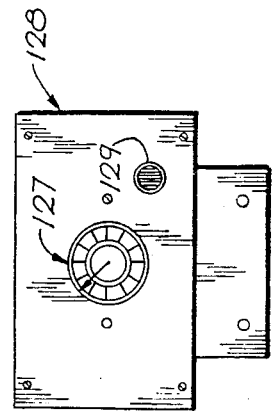
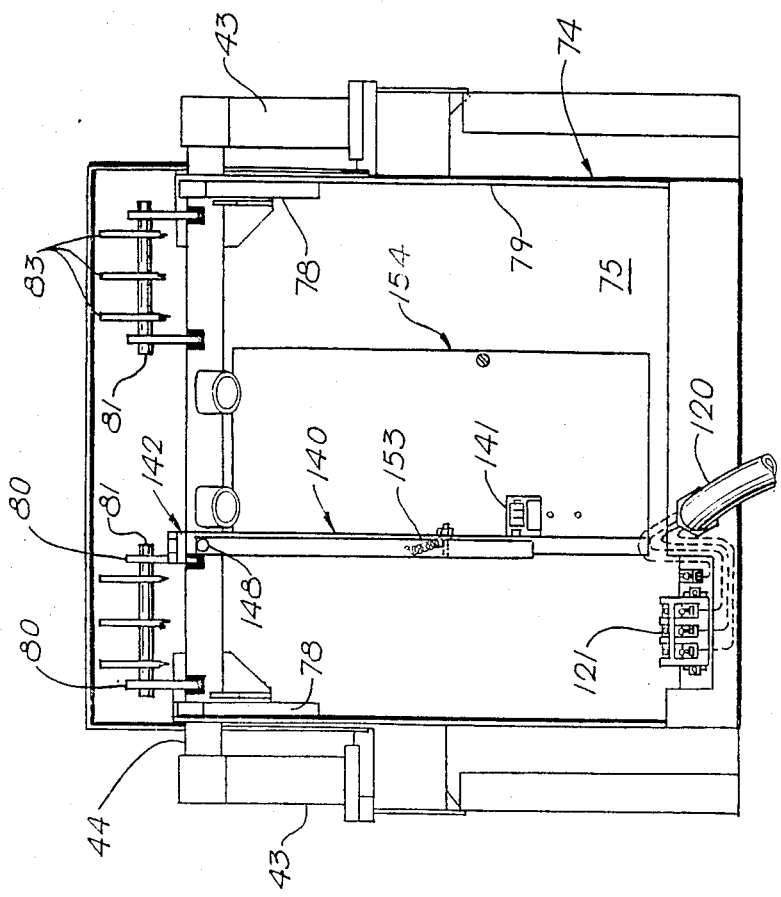

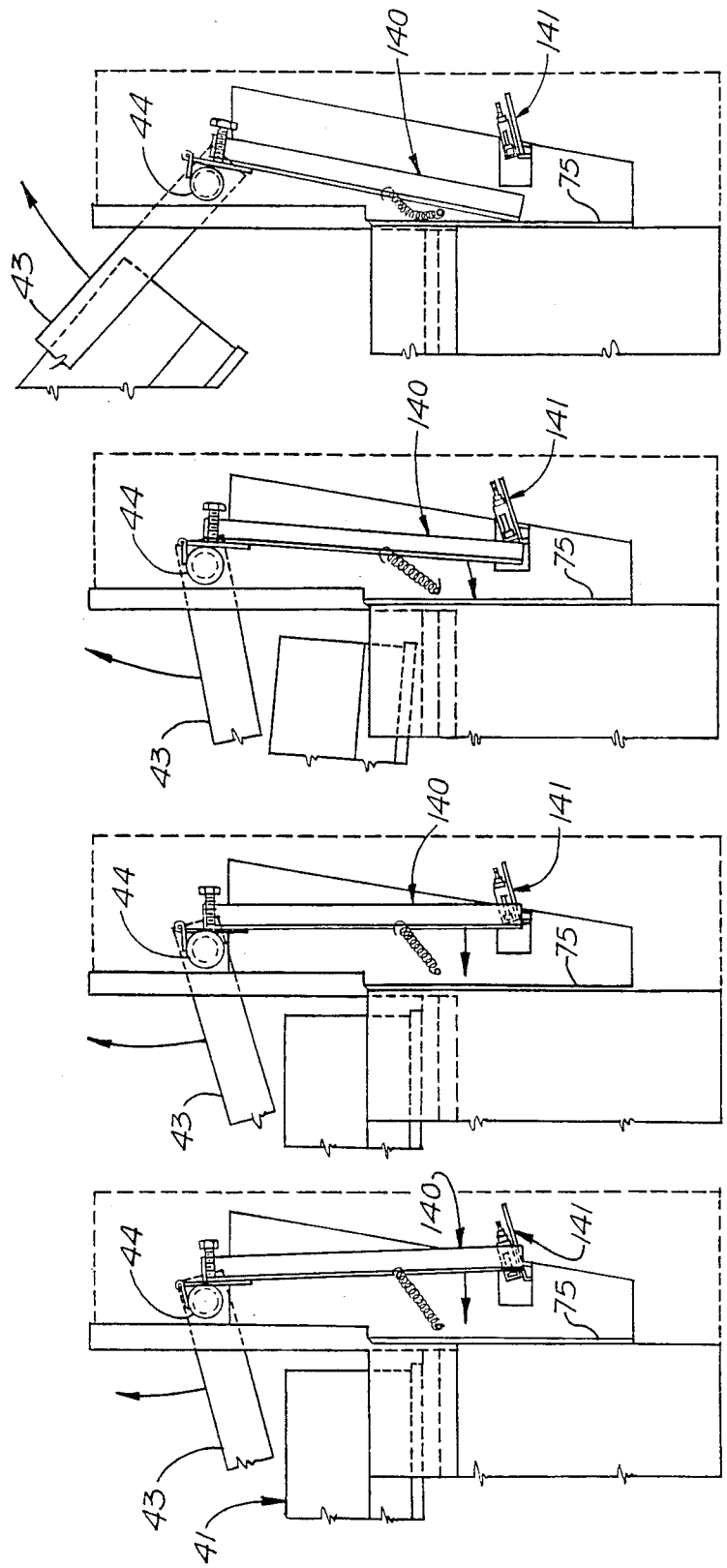

CHAR BROILING GRILL

This invention relates generally to cooking apparatus and more particularly to improvements in a dual or double platen grill for rapidly cooking and char broiling meats, poultry, fish and like products.

It is a principle object of this invention to provide an improved cooking grill having superposed heating platens, the uppermost of which is pivotally moveable about parallel axes and is cooperable with an underlying stationary platen to effect rapid two sided cooking of the raw food.

Another important object of this invention is to provide a cooking grill having stationary and moveable heating platens which is particularly adept at charring and cooking meats, poultry and fish to emulate charcoal grilling of such products.

Still another object of this invention is to provide a multiple platen cooking grill, as set out in the preceding object, in which the platens are distinguished by cooking surfaces of raised lands and depressed grooves which are easily and quickly cleaned and provide for relatively unobstructed release of moisture from the cooking products.

Having described the invention, the above and further objects, features and advantages thereof will be recognized from the following description of a preferred embodiment of the invention, illustrated in the accompanying drawings and representing the best mode presently contemplated for enabling those of skill in the art to practice this invention.

IN THE DRAWINGS

FIG. 6 is a front elevation of an automatic timer for use with the top grill;

FIG. 7 is a rear elevation of the grill assembly shown in FIG. 3, with cover and counter balance system removed;

FIGS. 7A–7D are a series of partial side elevations of the grill assembly, illustrating the particulars and operating positions of the timer actuator, shown in FIGS. 3 and 6;

FIG. 8 is a front elevation of a manually controlled thermostat for the top grill;

FIG. 9 is a front elevation of the grease trough used with the grill assembly of FIG. 1; and FIG. 10 is a side elevation of the grease trough shown in FIG. 9.

DESCRIPTION OF THE PREFERRED EMBODIMENT

Figure 1:
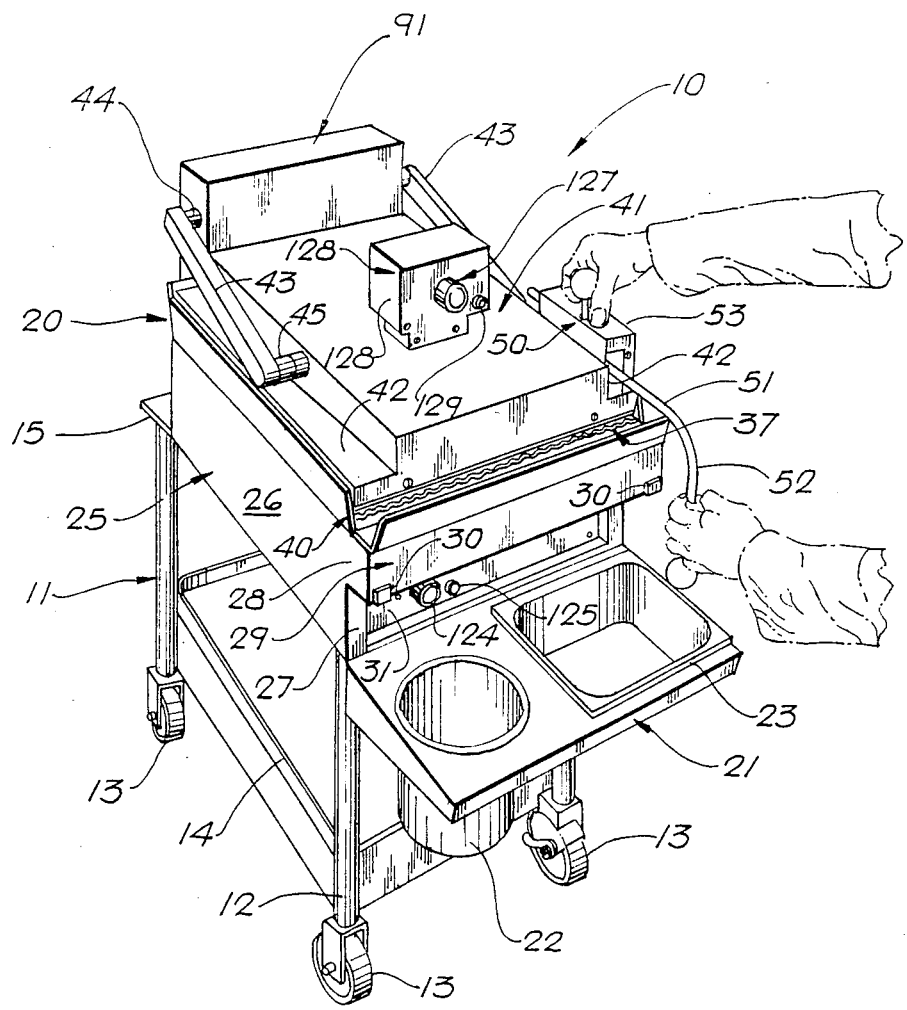
FIG. 1 is a perspective view of the improved cooking grill assembly of this invention.

Turning now initially to FIG. 1 of the drawings, the improved cooking grill of this invention, indicated generally at 10, comprises a suitable under support, such as cart 11 of generally conventional structure. As shown, cart 11 comprises four upright legs 12 each of which bears a ground engaging caster 13 at its lower end one of which at least should have a locking brake. An under shelf 14 cross connects the several legs 12 which mount suitable horizontal supports, such as a rear angle support 15 for under supporting the grill assembly 20 of this invention. A front shelf 21 is mounted across the front legs 12 of cart 11 to provide support for a bain marie pot 22 and utensil pan 23. It will be understood, of course, that while a specific under supporting cart 11 is illustrated in FIG. 1, such may be readily replaced by a stationary under supporting structure such as a counter top cabinet or the like.

Turning to the features of the grill assembly 20, as best shown in FIGS. 1 and 1A–1F, such comprises a generally rectangular shaped base cabinet 25 having parallel side walls 26 which are supported by a suitable internal framework 27 to which the side walls 26 are attached as by welding. The side walls are distinguished by forwardly projecting rectangular extensions 28 between which is mounted an elongated grease trough 29 that extends across the full width at the front of assembly 20 and is under carried by a pair of spaced forwardly projecting brackets 30. The grease trough 29 is removably mounted on brackets 30 adjacent a vertically disposed front wall panel 31 of cabinet 25.

As specifically illustrated in FIGS. 9 and 10 of the drawings, grease trough 29 comprises an elongated rectangular structure forming an open topped vessel having parallel spaced end walls 32, 32, a front wall 33, an angularly tilted integral splash guard 34 extending upwardly and outwardly of wall 33 and a foreshortened rectangular rear wall 35 integral with the front wall 33 and bottom wall 36 thereof. The size of the trough 29 as noted previously, is such as to fit snugly on top of the support brackets 30, 30 between the side wall projections 28, 28 of cabinet 25.

Figure 1A:
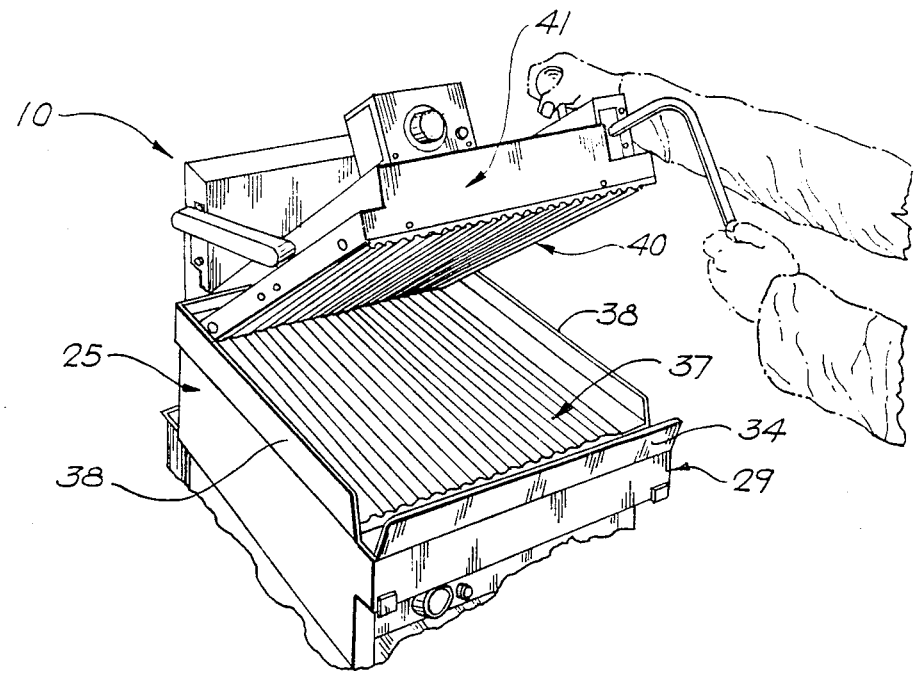
FIGS. 1A–1F are a series of partial perspective views of the dual grill assembly shown in FIG. 1 to illustrate of the conversion of the grill from a cooking mode to a cleaning mode.
Figure 3A:
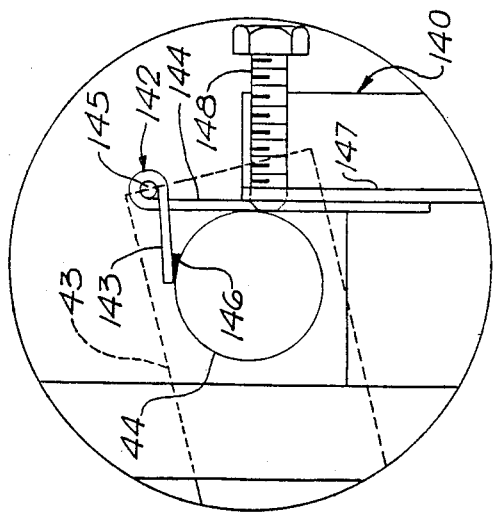
FIGS. 3A and 3B are enlarged detailed elevations of the encircled areas of FIG. 3.
Figure 3B:
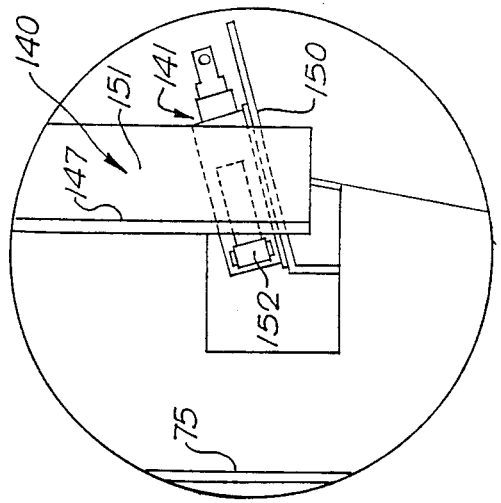
Figure 3:
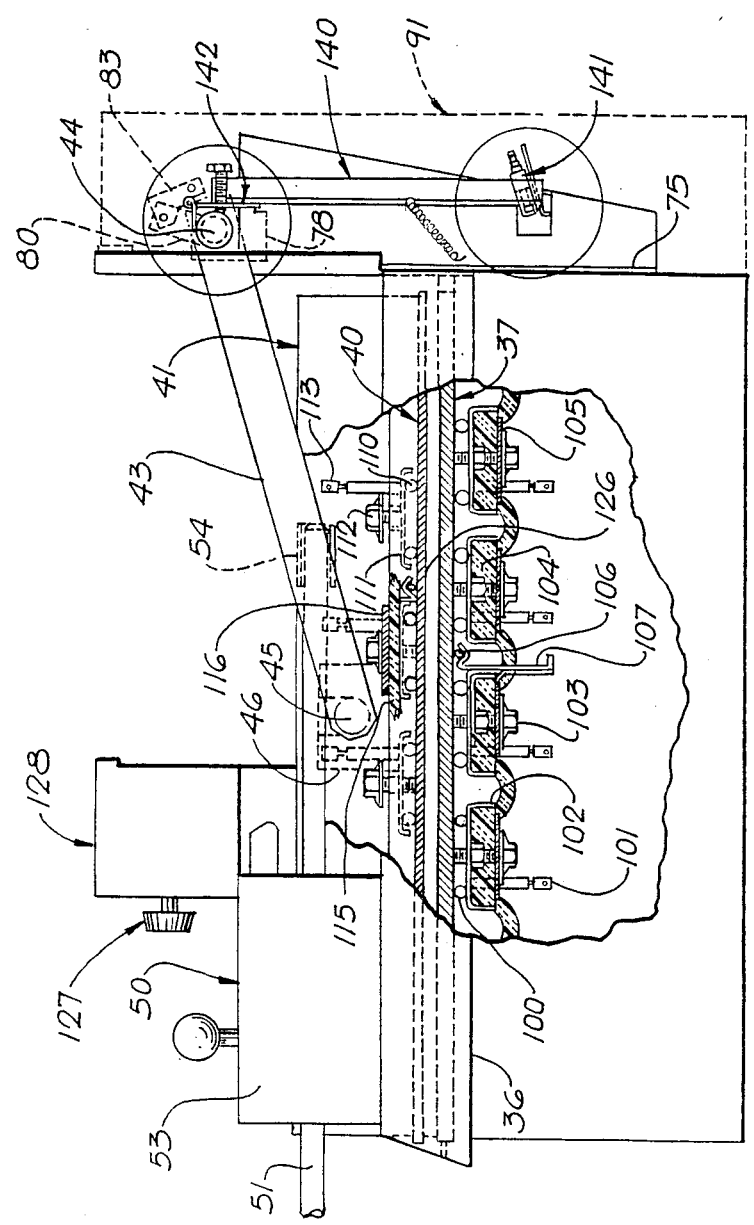
FIG. 3 is a side elevation of the grill assembly shown in FIG. 1, divorced from its support stand, with portions thereof broken away to show internal arrangement of parts.

The grill assembly 20, as indicated in FIGS. 1, 1A and 3, comprises a generally planar rectangular shaped metal bottom grill plate 37 which is mounted over the upper side of housing 25 to enclose the same. The grill plate 37 is surrounded on three sides by splash guards 38 which are welded thereto and cooperate with the splash guard 34 of the grease trough 29 to prevent unwanted spattering of hot greases and cooking juices during the cooking operation. The grill plate 37 is particularly distinguished by having its upper surface formed with a plurality of parallel spaced lands and grooves (unnumbered) running along the lengthwise axial dimension thereof. In the particular illustrated embodiment hereof the bottom grill plate is heated by conventional electrical heating elements, as will appear in greater detail hereinafter, although, the teachings and concepts of this invention apply with equal facility to gas fire heating of the grill plates, as will be understood by those familiar with the art.

As shown in FIGS. 1 and 1A, grill assembly 20 is also equipped with a top grill plate 40 which superposes the bottom grill plate and is also configured with lands and grooves. Grill plate 40 is mounted across the bottom face of an upper housing 41 which contains heating means, as will be described in greater particular hereafter. The lands and grooves of the two opposing grill plates are arranged so that the lands of the two plates are in registering alignment. Thus products heated therebetween are engaged directly by the lands of the two grill plates and the grooves between such lands serve to ventilate moisture released from the cooking products which is particularly important when cooking chicken which has a relatively high moisture content.

The housing 41 is generally of rectangular parallelopiped configuration with elongated recesses 42, 42 extending along opposite longitudinal margins thereof. A pair of angularly disposed yoke arms 43, 43 extend between a horizontally extending tubular rear pivot shaft 44 to which one end of each arm 43 is rigidly affixed. The opposite ends of arms 43 are joined to tubular trunion shafts 45 rotatably held in pillow blocks 46 (see FIG. 3) supported within the housing 41, substantially medially of the length of the top or upper grill plate 40. By this arrangement, the upper grill plate 40 is mounted for pivotal movement with arms 43 about the axis of the rearward shaft 44 and relative to such arms about the trunion shafts 45, as will be understood more fully hereinafter.

To enable the top or upper grill plate 40 to move with arms 43, a locking mechanism is provided, as indicated generally by numeral 50, which comprises an elongated operating rod 51 having a downwardly turned manually engageable outer end forming a handle portion 52. Rod 51 is mounted for reciprocating movement within a housing 53 so that the inner end of the rod 51 may be selectively engaged and disengaged with spaced keeper means 54 projecting from one face of the right hand arm 43 as viewed in FIG. 1. When the inner end of the operating rod 51 is engaged with keeper means 54, top grill plate 40 is locked to the arms 43 for pivotal movement therewith about the axis of shaft 44. When rod 51 is withdrawn from the keeper means 54 the upper grill plate is free to move about the axis of shaft 44 with arms 43 and relative to such arms about the axis of the coaxial trunion shafts 45, for purposes which will appear more fully hereinafter.

Figure 5:
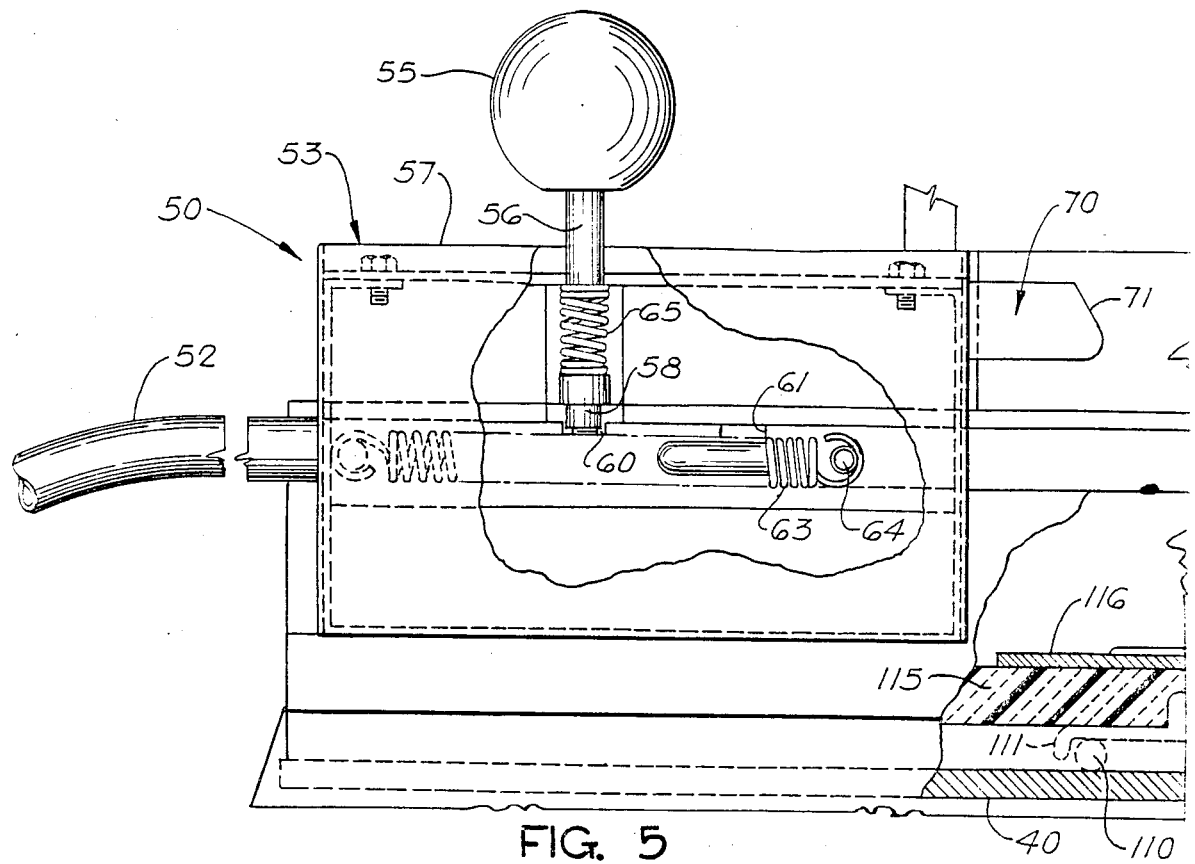
FIG. 5 is an enlarged partial side elevation, with parts broken away, of the handle and lock mechanism associated with the top grill.

In order to maintain the rod 51 in a desired position, i.e., latched to or disengaged from keeper means 54, a handle release knob 55 is provided at the upper end of a cylindrical latch pin 56 extending downwardly through the upper wall 57 of the housing 53 (see FIG. 5). A reduced diameter lower end portion 58 of pin 56 is adapted to engage axially spaced recesses 60 and 61 formed in the upper side of the operating rod 51 which is normally biased rearwardly or away from the yoke arm 43 with which it is associated by spring means 63 fastened at one end to the operating rod as by projecting pin means 64 and at its opposite end to the housing 53. Thus when the rod 51 is moved inwardly to engage the keeper means on the adjacent yoke arm 43, spring means 63 is tensioned to produce a biasing force for returning the handle 52 rearwardly. Such rearward biasing force is counteracted by engagement of the reduced end portion 58 of the locking pin 56 with recess 60 as illustrated in FIG. 5. The pin 56 is biased normally downwardly by compression spring means 65 so that releasing of the latch pin is effected against the force of the spring means 65 by engaging the operating knob 55 and raising pin 56 upwardly. The operating rod 51 is thereby released to move out the keeper means 54; such moving rearwardly under the biasing force of spring means 63 a distance sufficient for locking pin 56 to engage the second recess 61, thereby positively holding the handle 52 in its outward or withdrawn operating position.

As further shown in FIG. 5, housing 53 is also equipped with a stop finger 70 extending toward the adjacent yoke arm and having an angled or sloping outer end portion 71 for purposes which will appear in description which follows.

It will be appreciated that by means of the described operating rod 51 and locking means 50 a suitable latching system is provided for cooperation with the keeper means 54 associated with one of the yoke arms whereby the upper grill plate may be selectively locked with or released from the yoke arms to accomplish pivotal movement of the top grill about the pivotal axis of shaft 44 or about dual pivotal axis defined by the shaft 44 and trunions 45.

Figure 4:
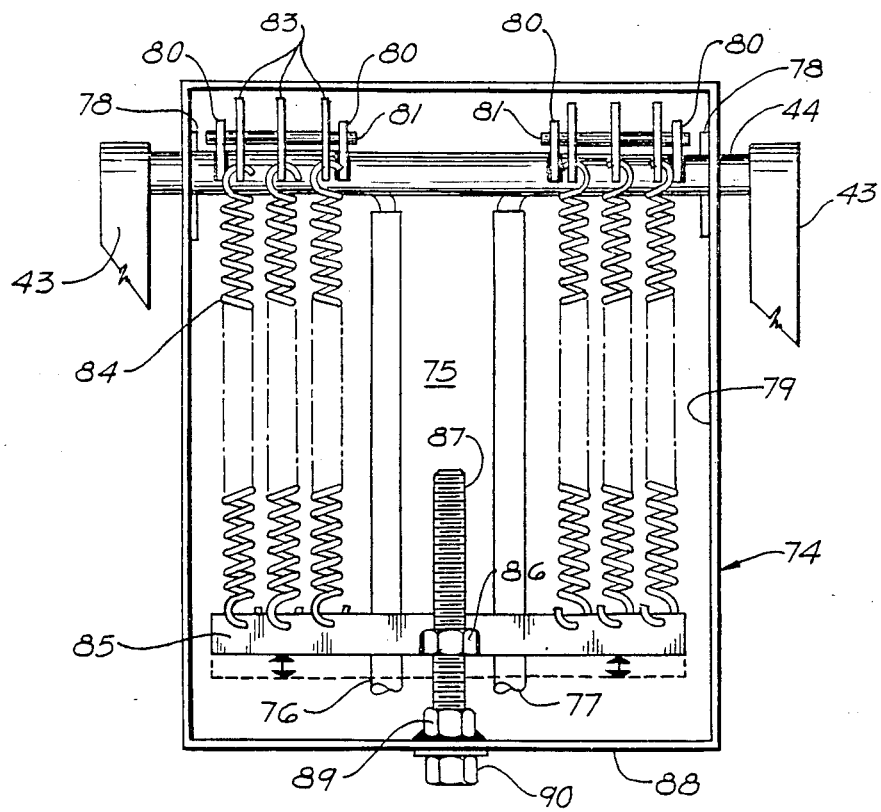
FIG. 4 is a partial enlarged rear elevation of the grill shown in FIG. 3, to illustrate the features of the counterbalance system thereof.

In order to assist and regulate the pivotal movements of the top grill about the axis of shaft 44, a suitable counterweight system, as illustrated in FIG. 4, is provided near the rearward ends of the two grill plates, as will now be described. As noted from FIG. 3 a rectangular box frame 74 is mounted behind back wall 75 of base cabinet 25, to support the tubular shaft 44 horizontally across the upper end of that frame 74. Shaft 44, the arms 43 and trunions 45 are hollow for the reception and passage therewithin of suitable electrical supply conductors 76 and 77 which carry electrical energy to the heating elements associated with the top grill plate. Split bearing pads 78 are provided adjacent each end of the shaft 44 for rotatably supporting the same; such pads being affixed to the inside face of side walls 79 of frame 74 adjacent openings (not shown) for the passage of shaft 44. Arms 43 are affixed, as by welding, to the outer ends of the tubular shaft 44 so that the arms move with shaft 44 simultaneously about the latter's longitudinal axis.

It also will be recognized that extending outwardly at an angle to the vertical when the top grill plate is in its lowered position, as illustrated in FIGS. 3 and 4, are pairs of parallel spaced crank arms 80, 80 located parallel to the box frame walls 79. Each pair of spaced crank arms 80 receives a pin shaft 81 horizontally therethrough on which are fixed crank links 83; three such links 83 on each shaft 81. Attached to the lower end of each of the crank links is the upper connective end of a tension spring 84, the lower end of which is attached to a rigid horizontal cross bar 85 disposed adjacent the lower end of box frame 74.

Cross bar 85 is affixed at its mid point, as by welding or the like, to a nut 86 associated with a vertically moveable adjustment bolt 87 located centrally of the bottom member 88 of the frame 74; the adjustment bolt 87 extending through such bottom member and threadingly engaging a second nut member 89 which is welded or affixed to the frame member 88. By engaging the head 90 of the bolt member 87 with a suitable wrench or the like, threading movement of the bolt serves to adjustably raise and lower the cross bar 85 in accordance with axial movement of the bolt. As a consequence tensioning of the several counter balancing springs 84 may be regulated. It will be appreciated that the tensioning forces provided by the several springs 84 serve to apply torque to the shaft 44 which is transmitted to the top grill via arms 43 and trunions 45, whereby to counter balance the weight of the top grill and assist in raising the same. As shown in FIGS. 1 and 3, for example, the counter balance assembly of FIG. 4 is suitably encased by a rear cover 91 in final assembly.

It will be recalled that the particular embodiment illustrated comprises a pair of electrically heated superposed grill plates and to that end particular reference is now made to FIG. 3 of the drawings wherein the bottom grill plate 37 is shown mounted over paired electrical heater elements 100 having electrical connector terminals 101 and under supporting brackets 102 held by flange headed bolts 103 which are fixed to the grill plate 37. It will be noted that each of the brackets 102 supports a body of insulation 104 which is under supported by a strap plate 105 carried on top of the wide flange head of the related bolt means 103. A thermostatic heat sensing bulb 106 is supported by a suitable bracket 107 so that the bulb 106 is in intimate contact with the underside of the grill plate 37. In a similar fashion the upper grill plate 40 is provided with electrical heater elements 110 carried beneath support brackets 111 held in place by flange headed bolt means 112, as in the structure for the lower grill plate. Suitable electrical connector terminals 113 are joined to an electrical power source for energizing the heater elements 110 in a known manner.

It will be noted that the flange headed bolts 112 carry a body of insulation 115 and a strap plate means 116, similar to the construction employed with the lower grill plate.

Typically a 208 volt, three phase, 60 hertz power supply is used to energize the heater elements 100 and 110 over a multiple lead supply cable 120 connected to a terminal block 121 as illustrated in FIG. 7 of the drawings. Such multiple lead supply conductors are in turn fed to the upper grill plate over the multiple lead conductors 76 and 77 which pass through the hollow interior of the shaft 44, support arms 43 and trunions 45 to the connector terminals 113 of the upper grill plate heater elements. Correspondingly the heater elements employed beneath the lower grill plate are wired to the terminal block 121 by appropriate conductors, not shown herein, but applied in a conventional fashion.

In order to regulate the temperature of the lower grill plate 37, a manually operable thermostatic control means 124 is provided with ready light 125 on the front panel 31 of the grill housing to operably sense the temperature of the lower grill plate via sensor bulb 106; such thermostatic control being in known circuit relationship with the power supply to periodically deenergize and energize the heater elements 100 for the lower grill plate. Similarly the upper grill plate is equipped with a thermostatic bulb 126 in circuit with a manually operable thermostatic control 127 fitted in housing 128 mounted atop of the upper grill plate housing 41 (see FIGS. 1 and 8). As shown, the manually controlled thermostat 127 is also equipped with a ready light 129. It will be understood, that by setting the manual control dial of the two thermostats 124 and 127, the operating temperatures of the correspondingly related lower and upper grill plates are independently regulated to desired levels in accordance with known practice.

Turning now to FIG. 6 of the drawings, the features of an alternate automatic timer and thermostatic control for use with the top grill will now be described. As there shown, a timer assembly indicated generally by numeral 130, comprises a suitable box-like housing 131 for carrying appropriate controls, adapted to be mounted on the top grill in place of housing 128. Specifically, timer assembly 130 comprises a manually set thermostatic control 132 with ready light 133 operable as above described plus a manually operable selection switch 134 which permits the operator to select "manual" or "automatic" timer operation. When manual operation is selected, a start button 135 with digital time read out 136 is employed to set the cooking time during which the product to be grilled is in heating contact with the top and bottom grill plates. Thus, when the top grill plate is lowered into contact with the product, the operator pushes the start button 135 and the desired cooking time shows on the digital read out panel 136. At the appropriate time by observation of the operator or upon hearing a suitable warning signal the top grill plate is lifted out of contact with the product to end the cooking cycle.

When automatic time control is selected by manipulation of switch 134, automatic timing of a preselected heating cycle is initiated whenever the top grill is stopped or rested between a low position (approximately $\frac{1}{8}$" to 3/16" above the bottom grill plate) and a high position (approximately 2-2$\frac{1}{2}$" above the bottom grill plate) for more than a delay period of 1-3 seconds, indicative of a cooking position for the top grill plate. Upon completion of the preset time cycle, a signal either visual, audio or both warns the operator and the top grill is then raised upwardly to complete the cooking cycle. If desired the timer, either in a manual or automatic mode, may be tied in with a known automatic lift mechanism (not shown) so that the operator will be relieved of the task of raising the top grill at the end of the cooking cycle. Alternatively, the timer control 130, in either the manual or automatic mode, may be coupled with a program start feature of the order disclosed in U.S. Pat. No. 3,894,483, issued July 15, 1975.

In order to control operation of the timer mechanism 130 in accordance with the positioning of the top grill plate, an appropriate electro-mechanical operating control is provided as illustrated in FIGS. 3, 7 and 7A-7D.

As shown in FIG. 3, an elongated actuating lever 140 is mounted for movement with shaft 44 and consequently with the top grill assembly to actuate a micro switch 141 arranged in a suitable control circuit (not shown) for activating and deactivating the automatic timer 130. More specifically, coupling of the actuating lever 140 to the shaft 44 is effected by means of a leaf hinge 142 having leaves 143 and 144 pivotally interjoined by a pintle pin 145. Leaf 143 is fixed to the upper side of shaft 44, as by welding, indicated at 146; the same being positioned intermediate the ends of the shaft 44 in an appropriate location of non-interference with other related parts (see FIGS. 3A and 7). Leaf 144 of the hinge means 142 is fixed, as by welding, to a transverse flange portion 147 of the lever 140 and is adapted to ride freely on the surface of the shaft 44. An adjustment bolt 148 threadingly passes through flange 147 to contact the surface of the shaft 44 whereby to adjust the angular disposition of lever 140 with respect to that shaft. This adjusts the position of the lower end of such lever with respect to the micro switch 141 and thus sets the time during the movement cycle of lever 140 when switch 141 is engaged and disengaged.

With specific reference to FIG. 3B of the drawings, it will be recognized that the micro switch assembly 141 is suitably carried by bracket means 150 so as to be adjacent a planar arm 151 of lever 140 whereby the surface of such arm 151 is operable to engage a roller 152 of the micro switch assembly as lever 140 moves therepast.

From FIG. 7 it will be recognized that the micro switch assembly 141 is housed within a protective covering 154 which also protects the electrical conductors for supplying energy to the upper grill plate. A spring means 153 extends between the flange 147 of lever 140 and the back wall of grill housing 25 to normally bias lever 140 toward the grill housing. With this arrangement it will be understood that as the lever 140 moves with rotation of the shaft 44 in response to raising and lowering movements of the top grill assembly, the lower end of lever 140 periodically passes across the roller 152 of the micro switch assembly to activate or deactivate the same.

With particular reference to FIGS. 7A-7D, the operational sequence and relationship of the actuating lever 140 and the automatic timer control 130 of FIG. 6 will now be set forth.

As shown in FIG. 7A, lever 140 is in a position whereat the top or upper grill assembly is lowered to a position in which lever 140 is disengaged from roller 152 of the micro switch assembly (see FIG. 3B) and the automatic timer control is deactivated. This occurs when the grill is empty awaiting introduction of product to be cooked.

As the top or upper grill plate assembly 41 is raised enough to cause the lower end of the actuating lever 140 to engage the roller 152 of the micro switch assembly, the cooking timer, which has an inbuilt 1-3 second operating delay, is conditioned for energization (see FIG. 7B). This occurs when moving the top grill plate assembly into or through cooking position. If the top grill stops in cooking position for more than the 1-3 second delay period, the cooking timer is energized to time the cooking cycle.

Raising the top or upper grill plate assembly to a loading position (i.e., past cooking position) eventually causes the actuating lever 140 to pass beyond roller 152, as indicated in FIG. 7C of the drawings. In this condition the timer control circuit is deactivated awaiting the next depression of the micro switch roller 152 upon lowering movement of the top grill.

In FIG. 7D it will be noted that the actuating lever 140 is totally out of engagement with the micro switch assembly 141 and in fact engages the back plate 75 of the grill housing. By providing the hinge means 142 at the upper end of the actuating lever 140, rotation of the shaft 44 relative to the lever arm is permitted. This allows the top grill to be fully raised to its upper limits without further effecting operation of the automatic timer.

Upon lowering movement of the top grill, the reverse activity to that outlined in FIG. 7A-7D occurs, i.e., the micro switch assembly 141 is activated when the actuating lever 140 arrives at its FIG. 7C position and continues to maintain its energized condition as long as the top grill plate 41 is between the prescribed elevation limits relative to the lower stationary grill plate. These are between the normal "cooking" and "loading" or "unloading" positions of the top grill. Due to the adjustment bolt 148 and its operation, these limits may be set at desired values, depending on the thickness of the product being cooked.

Use and Operation

Figure 2D:
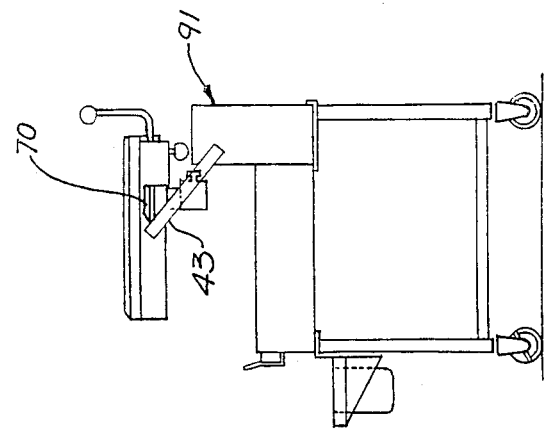
FIGS. 2A–2D are a series of schematic side elevations of the grill assembly shown in FIG. 1 illustrating four normal operating positions for the top grill.
Figure 2C:
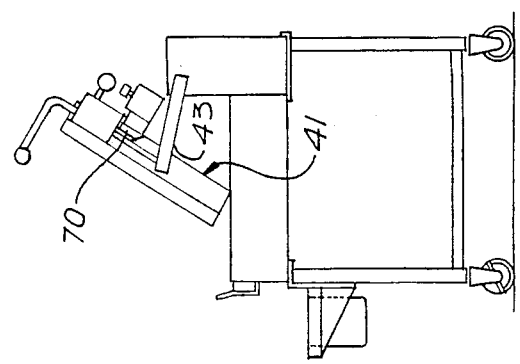
Figure 2B:
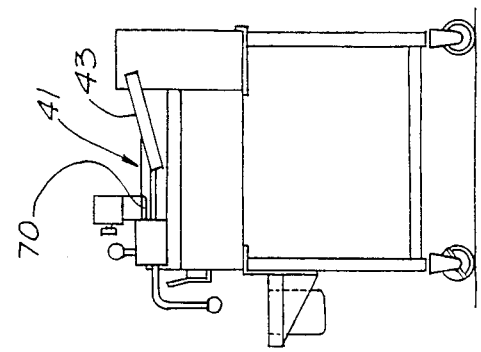

With reference to FIGS. 1 and 2B of the drawings, it will be seen that the grill assembly 10 according to this invention is therein illustrated in its normal "cooking" position with product loaded between the parallel upper and lower grill plates. In this respect pressure is applied by the upper grill on the product in the order of 12 lbs. of force so that the extending lands of the upper and lower grill plates compress the product therebetween. This causes the lands to char separated areas on the product surface, much as would occur in a conventional charcoal broiling operation.

Figure 2A:
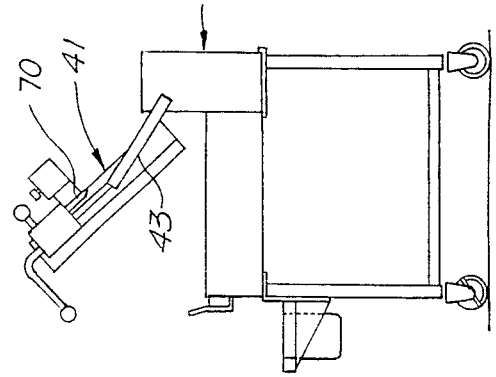

In FIGS. 1A and 2A, the grill is shown in a "loading" or "unloading" position in which the top grill plate is raised for inserting or removing product prior to or after the cooking operation is completed.

Figure 1B:
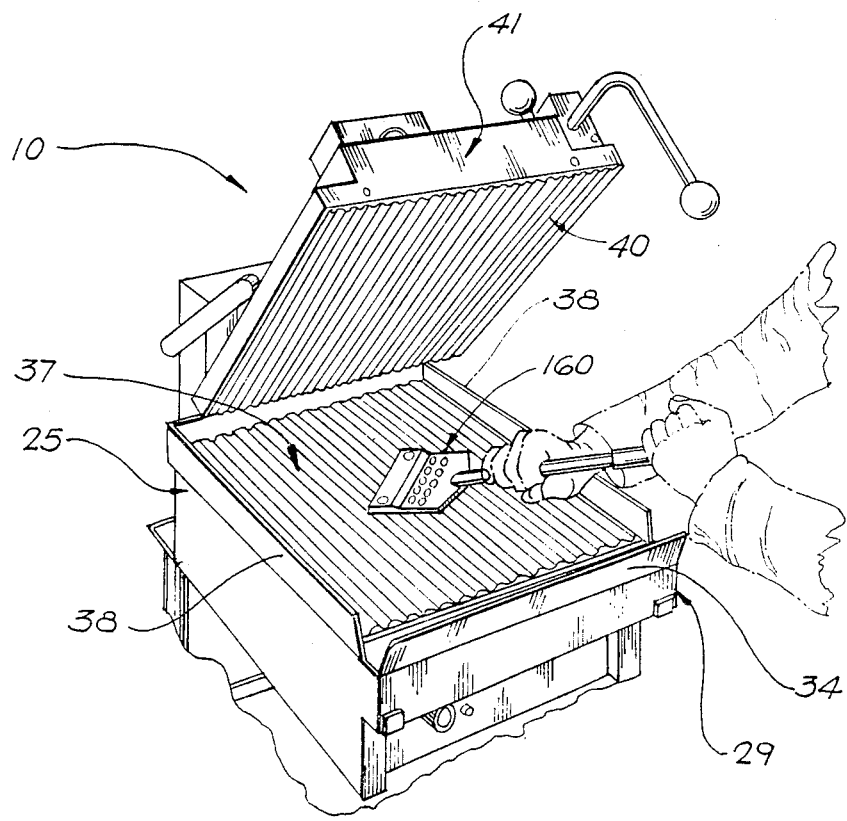
Figure 1C:
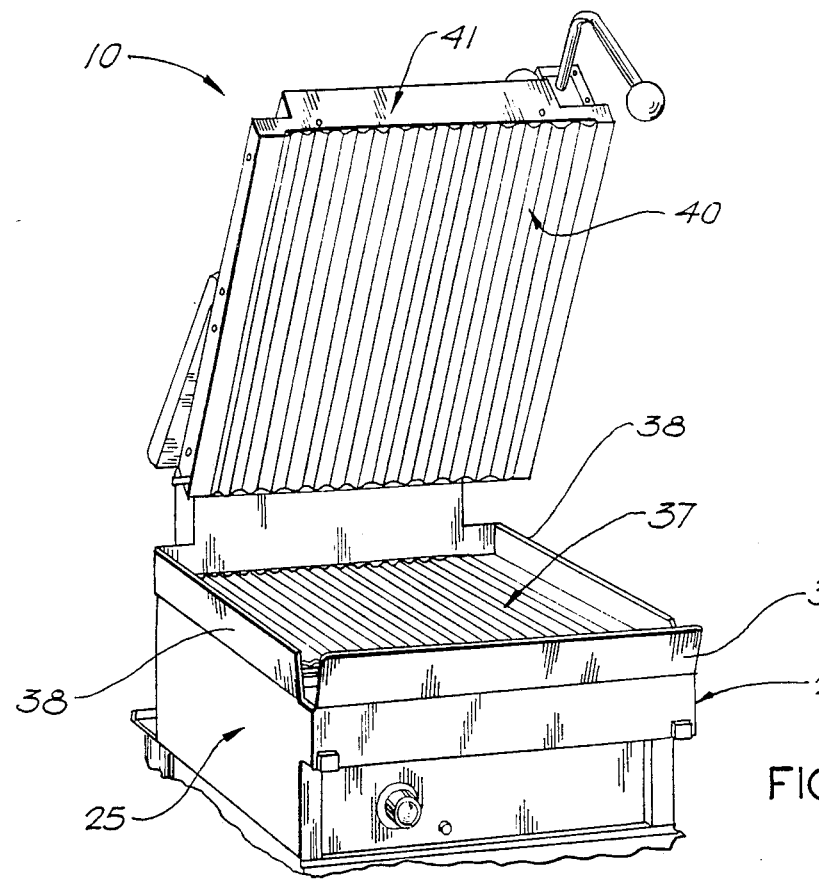
Figure 1D:
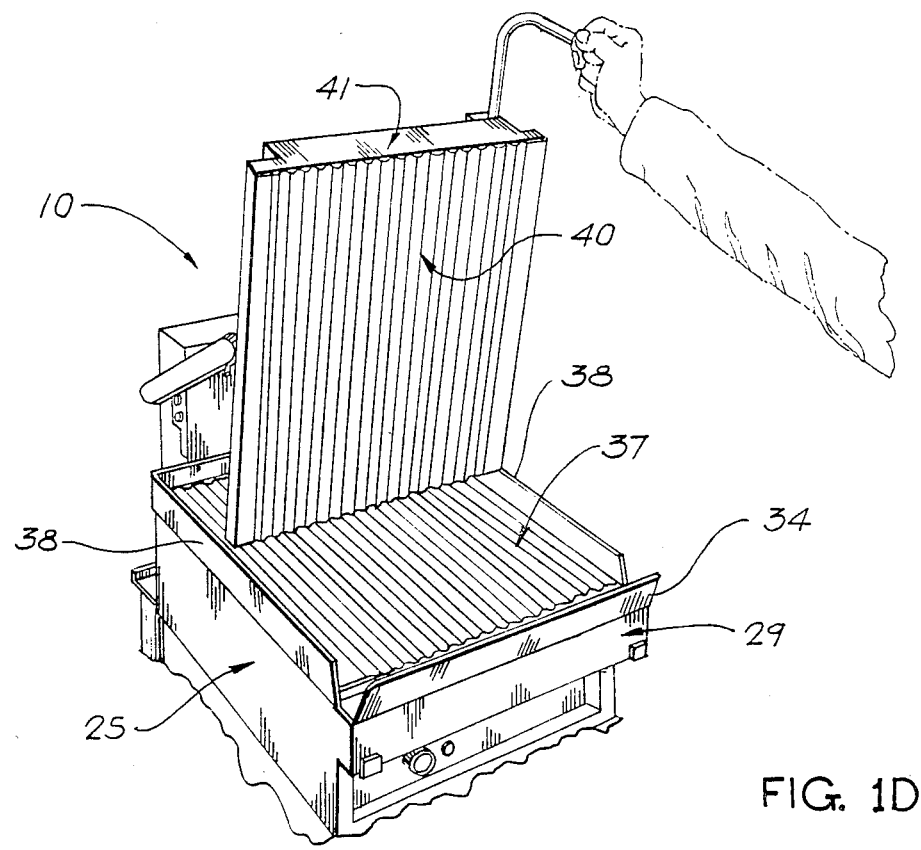
Figure 1E:
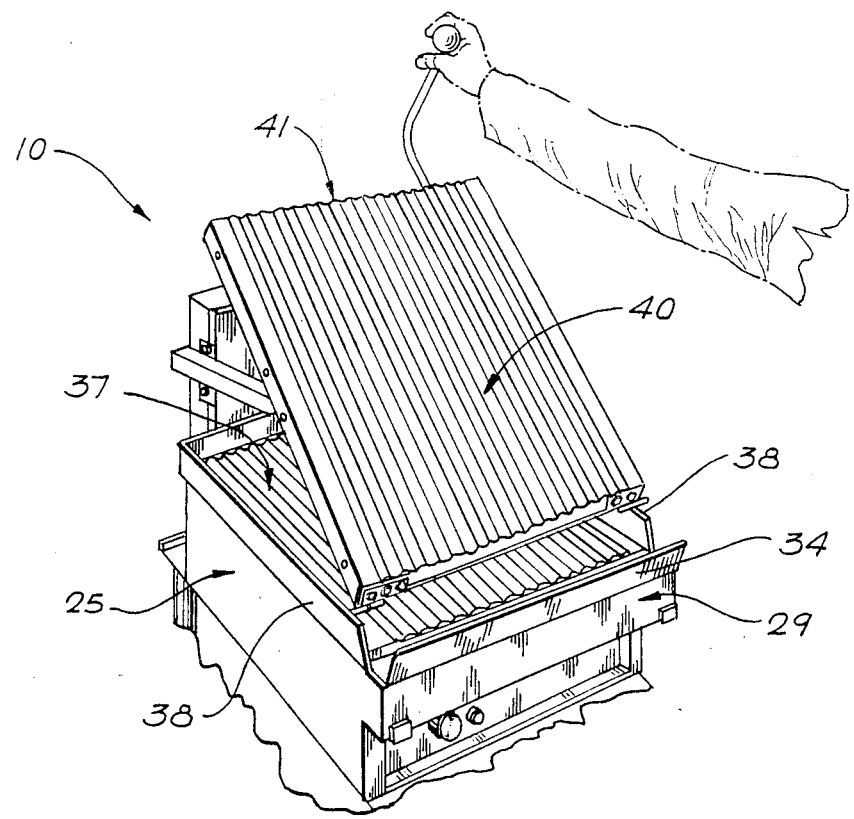

In this position with the upper grill plate raised as indicated in FIG. 1B of the drawings, the lower grill plate is capable of being cleaned with an appropriate scraper 160 of the order shown. This normally occurs after each cooking operation, as for example, after cooking a batch of chicken steaks.

In FIG. 2C the upper grill plate has been raised and positioned for a cleaning operation, having been flipped over after release of the latch mechanism 50 and withdrawal of the handle means 52 to release the upper grill from the yoke arms 43. This permits the upper grill to be positioned at substantially 45° atop the horizontal lower grill. This inverting operation of the top grill is illustrated in particular in FIGS. 1C, 1D and 1E of the drawings to arrive at the top grill cleaning position indicated in FIGS. 1E and 2C of the drawings.

Figure 1F:
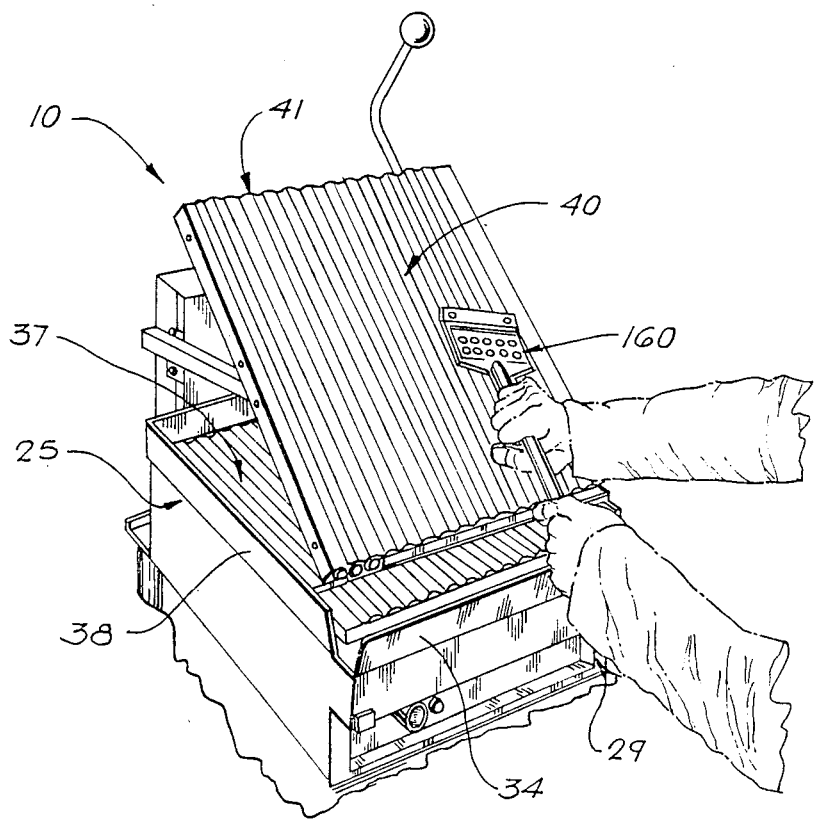

Cleaning of the upper grill is illustrated specifically in FIG. 1F of the drawings in which it will be noted that scraper 160 is used to clean the lands and grooves thereof, removing the grease and burned or charred particles to the front end of the bottom grill from whence the scrapings can be deposited conveniently in the drip or grease pan 29. This operation usually occurs periodically, after cooking a product batch.

In addition to the "loading" and "unloading", "cooking" and "cleaning" positions illustrated in FIGS. 1-1F of the drawings, the upper grill assembly also may be totally reversed and disposed in an upside down, position parallel to the lower grill as indicated in FIG. 2D of the drawings. In this condition it will be noted that the stop means 70 which projects from the locking mechanism 50, is engaged with the now angularly disposed adjacent arm 43. In this condition both the upper and lower grills may be operated as conventional tiered or parallel spaced open grills. More conventionally this positioning is utilized as a "seasoning" position in which the top grill plate is flipped to its extreme rotatable position relative to the yoke arms 43 and the grill surface thereof "seasoned" prior to commencing a cooking operation.

From the foregoing it is believed those skilled in the art will readily recognize and appreciate the novel advancements of this invention over the prior art and will understand that while the same has herein been described in association with the particular preferred embodiment thereof illustrated in the accompanying drawings, the same is susceptible to variation, modification and substitution of equivalents without departing from the spirit and teachings of the invention which are intended to be unlimited by the foregoing except as may appear in the following appended claims.

The embodiments of the invention in which an exclusive property or privilege is claimed are defined as follows:

1. A cooking grill assembly for char-broiling meat, fish, poultry and like products, comprising:

a stationary first grill plate mounted horizontally on an under support, means for heating said first grill plate, means for regulating the temperature of said first grill plate, a moveable second grill plate registeringly superposed over said first grill plate, means for heating said second grill plate independently of said first grill plate, second means for regulating the temperature of said second grill plate independently of said first grill plate, rotatable shaft means, defining a first axis, mounted in horizontal elevated position over one end of said first and second grill plates, a pair of parallel spaced arms attached to said shaft means for movement therewith about said first axis, coaxially aligned horizontal trunion means extending from opposite sides of said second grill plate and defining a second axis; the opposite ends of said arms being attached to said trunion means for movement about said second axis;

latch means for interlocking said moveable second grill plate and said arms for conjoint movement about said first axis, and means for selectively unlatching said moveable second grill plate from said arms whereby to permit the latter to be selectively moved about said second axis relative to said arms, independently of the movement thereof about said first axis.

2. The grill assembly of claim 1, and means for retaining said latch means in first and second positions for respectively interlocking and unlocking said arms and second grill plate as selected.

3. The grill assembly of claim 1, characterized by said first and second grill plates having opposed cooking surfaces formed with plural parallel raised lands separated by depressed grooves which are registeringly aligned.

4. The grill assembly of claim 1, wherein said means for heating said first and second grill plates comprise electrically energized elements, and said shaft means, arms and trunion means are hollow for internally carrying electrical conductors for energizing said elements associated with said second grill plate.

5. The grill assembly of claim 1, and timer means for selectively regulating the duration of the cooking cycle during which the two grill plates are engaged with product to be broiled, and means responsive to rotational movements of said shaft means for controlling operation of said timer means in accordance with predetermined positioning of said second grill plate.

6. The grill assembly of claim 5, wherein said timer means is electrically energized, and said means responsive to movements of said shaft means comprises switch means for controlling energization and deenergization of said timer means, and means coupled to said shaft means for activating said switch means in response to adjustably selected rotation of said shaft means.

7. The grill assembly of claim 1, and spring means coupled to said shaft means for counter balancing the weight of said second grill plate, and means for adjustably regulating the counter balancing force exerted by said spring means.

* * * * *